United States Patent
Yu et al.

(10) Patent No.: US 12,389,026 B2
(45) Date of Patent: Aug. 12, 2025

(54) APPARATUS AND METHOD FOR OUTPUTTING IMAGE DATA, AND ELECTRONIC DEVICE

(71) Applicant: Rockchip Electronics Co., Ltd., Fuzhou (CN)

(72) Inventors: Zhichao Yu, Fuzhou (CN); Delong He, Fuzhou (CN); Zhihua Wang, Fuzhou (CN); Yongzhen Yu, Fuzhou (CN)

(73) Assignee: Rockchip Electronics Co., Ltd., Fujian (CN)

( * ) Notice: Subject to any disclaimer, the term of this patent is extended or adjusted under 35 U.S.C. 154(b) by 60 days.

(21) Appl. No.: 18/241,259

(22) Filed: Sep. 1, 2023

(65) Prior Publication Data

US 2024/0129513 A1    Apr. 18, 2024

(30) Foreign Application Priority Data

Sep. 8, 2022    (CN) .......................... 202211097492.1

(51) Int. Cl.
*H04N 19/463*    (2014.01)
*H04N 19/14*    (2014.01)
*H04N 19/172*    (2014.01)

(52) U.S. Cl.
CPC ........... *H04N 19/463* (2014.11); *H04N 19/14* (2014.11); *H04N 19/172* (2014.11)

(58) Field of Classification Search
CPC ..... H04N 19/463; H04N 19/14; H04N 19/172
See application file for complete search history.

(56) References Cited

U.S. PATENT DOCUMENTS

| 5,930,398 A * | 7/1999 | Watney ................ H04N 19/192 382/250 |
| 9,094,685 B2 * | 7/2015 | Yang .................... H04N 19/107 |
| 2003/0202580 A1 * | 10/2003 | Noh ........................ H04N 19/14 348/700 |

(Continued)

FOREIGN PATENT DOCUMENTS

| CN | 101188755 | * | 12/2007 |
| WO | WO-9222986 | * | 6/1992 |

OTHER PUBLICATIONS

Huang,Chao translation CN 101188755 Dec. 14, 2007 (Year: 2007).*

*Primary Examiner* — Zaihan Jiang
(74) *Attorney, Agent, or Firm* — IPRTOP LLC

(57) ABSTRACT

An apparatus and a method for outputting image data, and an electronic device are provided. The apparatus includes a first parameter setter, an image signal processor, and an encoder, wherein the first parameter setter sets a first configuration parameter for the image signal processor based on a complexity associated with an input image frame, wherein the image signal processor performs an image signal processing on at least one image frame to generate processed image data based on the first configuration parameter, wherein the encoder performs encoding processing on the processed image data to generate encoded image data. The apparatus and the method for outputting image data, and the electronic device of the present disclosure adjust parameters of the image signal processor and the encoder according to the complexity associated with an input image frame, thereby effectively improving the overall performance of image processing, encoding and compression.

16 Claims, 5 Drawing Sheets

(56) References Cited

U.S. PATENT DOCUMENTS

| | | | | |
|---|---|---|---|---|
| 2008/0192822 A1* | 8/2008 | Chang | .................. | H04N 19/124 |
| | | | | 375/E7.181 |
| 2010/0104017 A1* | 4/2010 | Faerber | .............. | H04N 21/2383 |
| | | | | 375/295 |
| 2012/0294355 A1* | 11/2012 | Holcomb | ............. | H04N 19/157 |
| | | | | 375/240.03 |
| 2013/0223515 A1* | 8/2013 | Shetty | .................. | H04N 19/107 |
| | | | | 375/E7.181 |
| 2014/0153644 A1* | 6/2014 | Dzik | .................... | H04N 19/119 |
| | | | | 375/240.12 |
| 2016/0295250 A1* | 10/2016 | Yang | .............. | H04N 21/234363 |
| 2021/0360258 A1* | 11/2021 | Qin | ....................... | H04N 19/194 |

* cited by examiner

APPARATUS AND METHOD FOR OUTPUTTING IMAGE DATA, AND ELECTRONIC DEVICE

CROSS REFERENCE TO RELATED APPLICATION

The present application claims the benefit of priority to Chinese Patent Application No. CN 202211097492.1, entitled "APPARATUS AND METHOD FOR OUTPUTTING IMAGE DATA, STORAGE MEDIUM, AND ELECTRONIC DEVICE", filed with CNIPA on Sep. 8, 2022, the disclosure of which is incorporated herein by reference in its entirety for all purposes.

FIELD OF THE INVENTION

The present disclosure generally relates to image processing, and in particular, to apparatus and method for outputting image data, storage medium, and electronic device.

BACKGROUND OF THE INVENTION

During an image processing, images captured by an image acquisition device are typically processed by an image signal processor and then sent to an encoder. When there are constraints on the target bit rate or when the application scenario is complex, an improved image processing is desired.

SUMMARY OF THE INVENTION

In a first aspect, the present disclosure provides an apparatus for outputting image data. The apparatus includes a first parameter setter, an image signal processor, and an encoder, wherein the first parameter setter is configured to set a first configuration parameter for the image signal processor based on a complexity associated with an input image frame, wherein the image signal processor is configured to perform an image signal processing on at least one image frame to generate processed image data based on the first configuration parameter, wherein the encoder is configured to perform encoding processing on the processed image data to generate encoded image data.

In a second aspect, the present disclosure provides a method for outputting image data. The method includes setting, by a first parameter setter, a first configuration parameter for an image signal processor based on a complexity associated with an input image frame; performing, by the image signal processor, an image signal processing on at least one image frame to generate processed image data based on the first configuration parameter; and encoding, by an encoder, the processed image data to generate encoded image data.

In a third aspect, the present disclosure provides an electronic device, including: a memory, configured to store a computer program is stored; and a processor, communicatively connected to the memory and configured to call the computer program to perform: setting a first configuration parameter based on a complexity associated with an input image frame; performing image signal processing on at least one image frame to generate processed image data based on the first configuration parameter; and encoding the processed image data to generate encoded image data.

According to embodiments of the present disclosure, the encoder's encoding state is evaluated based on the complexities of the input image frames; the parameters of both the image signal processor and the encoder are then adjusted accordingly to effectively improve image processing performance; additionally, by adjusting the video source at the encoder's input end, source-level adjustments are achieved, making the entire image processing system more efficient; furthermore, the present disclosure can be applied to various application scenarios, even when the target bit rate is low or limited or when the application scenario is complex.

DETAILED DESCRIPTION

Figure 1:
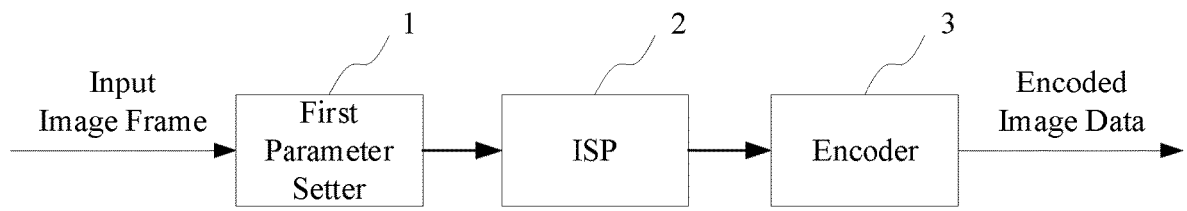
FIG. 1 shows a schematic structural diagram of an apparatus for outputting image data according to an embodiment of the present disclosure.

The embodiments of the present disclosure will be described below. Those skilled can easily understand disclosure advantages and effects of the present disclosure according to contents disclosed by the specification. The present disclosure can also be implemented or applied through other different specific embodiments. Various details in this specification can also be modified or changed based on different viewpoints and applications without departing from the spirit of the present disclosure.

It should be noted that the drawings provided in this disclosure only illustrate the basic concept of the present disclosure in a schematic way, so the drawings only show the components closely related to the present disclosure. The drawings are not necessarily drawn according to the number, shape and size of the components in actual implementation; during the actual implementation, the type, quantity and proportion of each component can be changed as needed, and the components' layout may also be more complicated.

When there are constraints on the target bit rate or when the application scenario is complex, the encoder's encoding state can be fed back to the image signal processor or the encoder's encoding behavior can be analyzed within the image signal processor. By jointly debugging the parameters of both the image signal processor and encoder, the image processing can be improved even when the target bit rate is limited or the application scenario is complex.

In one embodiment of the present disclosure, when an image signal processor and an encoder are in cascade are being debugged, the two are debugged separately.

In one technical solution, the debugging process is as follows: image complexity of processed image data is first received, which is obtained by an image processor connected to the encoder; an encoding bit of the processed image data is then determined; according to the image complexity and the encoding bit, quantization parameters of the processed image data are then obtained; according to the quantization parameters of the processed image data, the processed image data is finally encoded. This process can balance the accuracy of bit rate control and the computational complexity of the encoder.

In another technical solution, an image preprocessing block is configured to: receive image data; process the received image data to provide an image including one or more image portions each including a plurality of pixels; for each image portion in one or more image portions in the image, analyze the pixels in this image portion to estimate a complexity indicator of this image portion; determine metadata based on one or more estimated complexity indicators for one or more of the image portions; and output the determined metadata. In addition, an encoder processing block is configured to: receive the metadata determined by the image preprocessing block; use the received metadata to determine a quantization level for use when encoding the image; and encode the image using the determined quantization level. It can be seen that both methods adjust the quantization parameters of the encoder.

These methods do not have problems when the target bit rate is relatively large or when the application scenario is relatively simple. However, when the target bit rate is low or limited or when the application scenario is complex, there will be obvious problems. This is because when the encoder uses a low bit rate, the image signal processor will complicate the image by, e.g., sharpening and contrast processing, since the image signal processor doesn't "know" about the low bit rate, making it impossible for the encoder to encode complex scenarios based on a low bit rate; conversely, when the encoder uses a high bit rate, the image signal processor will simplify the image since the image signal processor doesn't "know" about the high bit rate, resulting in insufficient sharpness, contrast and clarity.

The present disclosure therefore provides further embodiments for outputting image data, as described below. According to one embodiment of the present disclosure, for an image signal processor and an encoder in cascade, the encoder's encoding state is evaluated based on complexities of previous image frames. Then parameters of the image signal processor are adjusted according to the encoder's encoding state. In this way, adjustments are made from the source at the input end of the encoder, thereby achieving source-level adjustments, making the entire image processing system more efficient and effectively improving the overall performance of image processing and encoding compression. Herein, a current complexity includes an intra-frame complexity and inter-frame complexity associated with a current frame. The intra-frame complexity can be calculated based on the data within the current frame, and the inter-frame complexity can be calculated based on the current frame and at least one previous frame.

In the following, embodiments of the present disclosure are described by way of specific implementations in conjunction with accompanying drawings.

FIG. 1 shows a schematic structural diagram of an apparatus for outputting image data according to an embodiment of the present disclosure. As shown in FIG. 1, the apparatus includes a first parameter setter 1, an image signal processor 2, and an encoder 3.

The first parameter setter 1 is configured to set a first configuration parameter for the image signal processor based on a complexity associated with input image frames. The first configuration parameter and the complexity associated with the image frames may be in a one-to-one correspondence. The image frames include a current image frame and subsequent image frames. In some embodiments, the first configuration parameter includes 3D denoising parameters (3DNR), 2D denoising parameters (2DNR), contrast noise parameters (CNR), sharpening parameters, etc. Their adjustment can be done through preferential adjustment or precise adjustment.

The image signal processor 2 is connected to the first parameter setter 1. The image signal processor 2 is configured to perform image signal processing on at least one image frame to generate processed image data based on the first configuration parameter. In some embodiments, the image frames, that are successive and captured by an image acquisition device (e.g., a camera), are fed to the image signal processor 2 for image signal processing to obtain the processed image data.

The encoder 3 is connected to the image signal processor 2. The encoder 3 is configured to encode the processed image data to generate encoded image data. In some embodiments, the encoder 3 outputs a data stream.

The first parameter setter 1 may set the first configuration parameter for the image signal processor 2 in various ways as described below. FIGS. 2 to 5 are diagrams showing the first parameter setter setting the first configuration parameter for the image signal processor according to various embodiment of the present disclosure.

Figure 2:
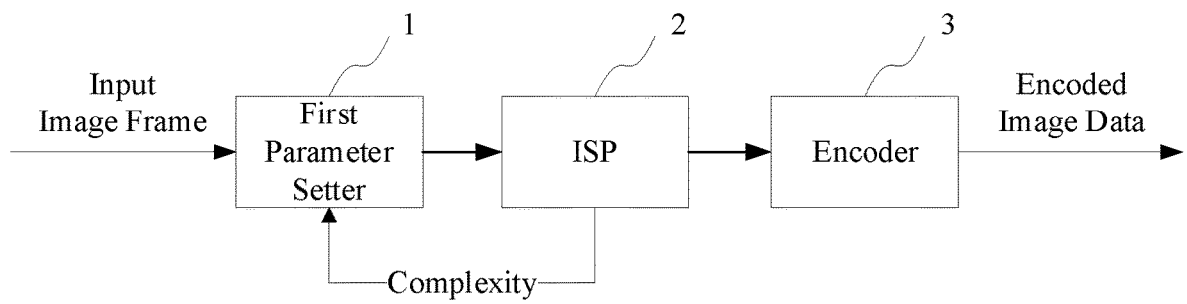
FIG. 2 is a diagram showing a first parameter setter setting a first configuration parameter for an image signal processor according to an embodiment of the present disclosure.

In the embodiment as shown in FIG. 2, the image signal processor 2 is configured to calculate a current complexity of a current image frame and to provide the current complexity to the first parameter setter 1. The first parameter setter 1 is configured to set the first configuration parameter corresponding to at least one subsequent image frame for the image signal processor 2 based on the current complexity. A complexity of an image frame may include motion complexity, image texture complexity, image texture variance, etc. In some embodiments, complexities of image frames are associated with the first configuration parameter. A comparison table between the complexities of image frames (i.e., the current image frame or a subsequent image frame) and the first configuration parameter can be preset. When the first configuration parameter needs to be adjusted, matching first configuration parameters are found based on the corresponding current complexity and adjusted.

Figure 3:
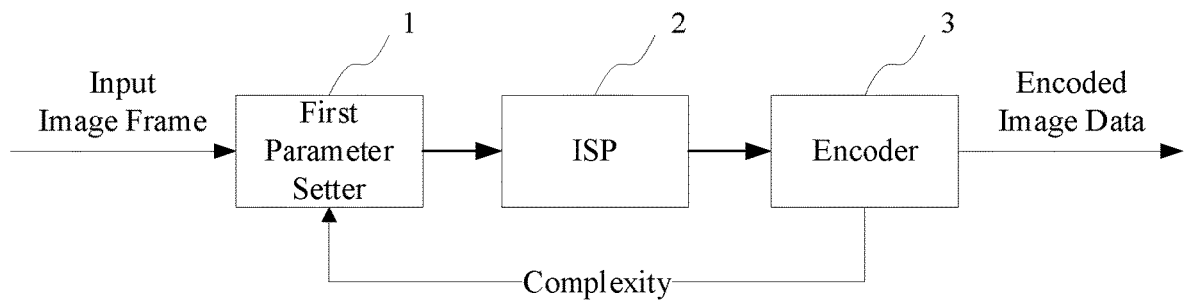
FIG. 3 is a diagram showing a first parameter setter setting a first configuration parameter for an image signal processor according to a further embodiment of the present disclosure.

In the embodiment as shown in FIG. 3, the encoder 3 is further configured to calculate a current complexity of current processed image data corresponding to the current image frame and to provide the current complexity to the first parameter setter 1. It should be noted that the processed image data include the current processed image data corresponding to the current image frame and subsequent processed image data corresponding to the subsequent image frames. The first parameter setter 1 is configured to set the first configuration parameter corresponding to at least one subsequent image frame for the image signal processor 2 based on the current complexity. The current complexity may include motion complexity, image texture complexity, image texture variance, encoder quantization parameter QP value, encoder structural similarity parameter ssim, etc. In some embodiments, complexities of processed image data are associated with the first configuration parameter. A comparison table between the complexities of processed image data (i.e., the current processed image data or subsequent processed image data) and the first configuration parameter can be preset. When the first configuration parameter needs to be adjusted, matching first configuration parameters are found based on the corresponding current complexity and adjusted.

Figure 4:
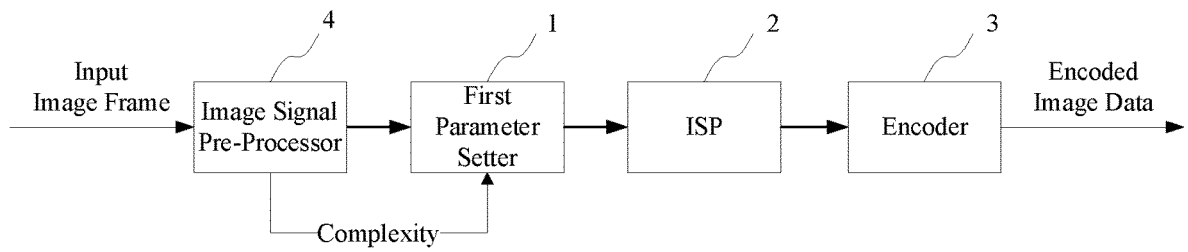
FIG. 4 is a diagram showing a first parameter setter setting a first configuration parameter for an image signal processor according to a further embodiment of the present disclosure.

In the embodiment as shown in FIG. 4, the apparatus for outputting image data according to the present disclosure further includes an image signal preprocessor 4. The image signal preprocessor 4 is connected to the first parameter setter 1. The image signal preprocessor 4 is configured to calculate a current complexity of a current image frame and to provide the current complexity to the first parameter setter 1. The first parameter setter 1 is configured to set the first configuration parameter corresponding to the current image frame or corresponding to both the current image frame and at least one subsequent image frame for the image signal processor 2 based on the current complexity. A complexity of an image frame may include motion complexity, image texture complexity, image texture variance, etc. In some embodiments, complexities of image frames are associated with the first configuration parameter. A comparison table between the complexities of image frames (i.e., the current image frame or a subsequent image frame) and the first configuration parameter can be preset. When the first configuration parameter needs to be adjusted, matching first configuration parameters are found based on the corresponding current complexity and adjusted.

Figure 5:
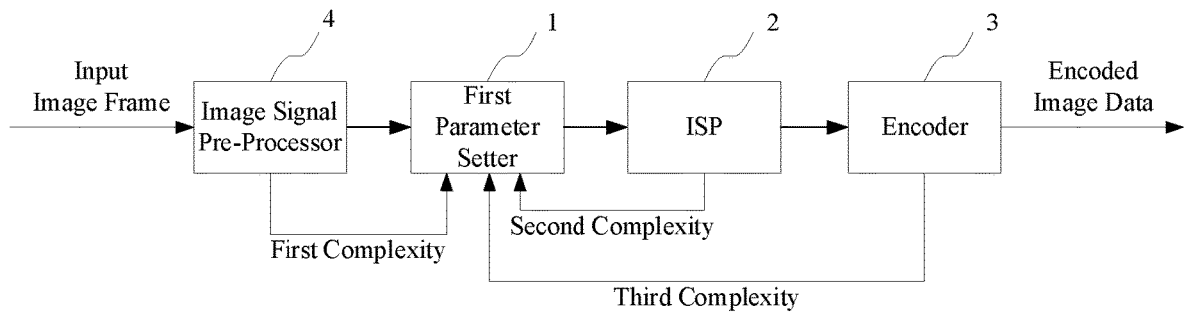
FIG. 5 is a diagram showing a first parameter setter setting a first configuration parameter for an image signal processor according to a further embodiment of the present disclosure.

In the embodiment as shown in FIG. 5, the image signal preprocessor 4 is configured to calculate a first complexity of the current image frame and to provide the first complexity to the first parameter setter 1. The image signal processor 2 is further configured to calculate a second complexity of the current image frame and to provide the second complexity to the first parameter setter 1. The encoder 3 is further configured to calculate a third complexity of the current processed image data corresponding to the current image frame and to provide the third complexity to the first parameter setter 1.

The first parameter setter 1 is connected to the image signal processor 2, the encoder 3 and the image signal preprocessor 4. The first parameter setter 1 is configured to set the first configuration parameter based on at least two of the first complexity, the second complexity, and the third complexity. The second complexity may include the current image frame's motion complexity, image texture complexity, image texture variance, etc. The third complexity may include the current processed image data's motion complexity, image texture complexity, image texture variance, encoder quantization parameter QP value, encoder structural similarity parameter ssim, etc.

In some embodiments, a complexity includes an intra-frame complexity and an inter-frame complexity. The intra-frame complexity can be calculated based on the data within the current frame, and the inter-frame complexity can be calculated based on the current frame and at least one previous frame.

According to embodiments of the present disclosure, configuration parameters for the image signal processor are evaluated by analyzing complexities of the input image frames, and the image signal processor is then adjusted according to the configuration parameters for subsequent encoding processing. In this way, adjustments are made from the source at the input end of the encoder, thereby achieving source-level adjustments, making the entire image processing system more efficient and effectively improving the overall performance of image processing and encoding compression.

Figure 6:
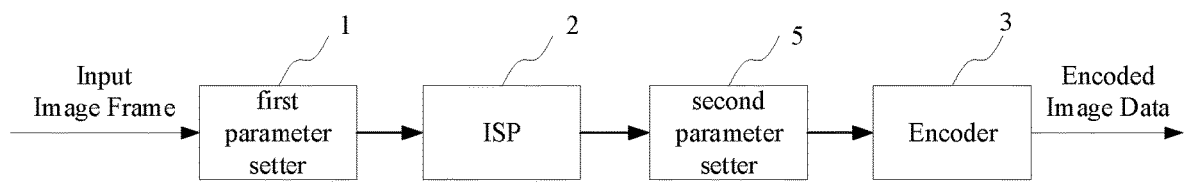
FIG. 6 shows a schematic structural diagram of an apparatus for outputting image data according to an embodiment of the present disclosure.

FIG. 6 shows a schematic structural diagram of an apparatus for outputting image data according to an embodiment of the present disclosure. As shown in FIG. 6, the apparatus further includes a second parameter setter 5 as compared to the apparatus shown in FIG. 1. The second parameter setter 5 is connected to the image signal processor 2 and the encoder 3. The second parameter setter 5 is configured to set a second configuration parameter for the encoder 3. The encoder 3 is configured to encode the processed image data based on the second configuration parameter to generate the encoded image data. The second configuration parameter may include coding mode parameters, quantization parameters, etc. Their adjustment can be done through preferential adjustment or precise adjustment.

Figure 7:
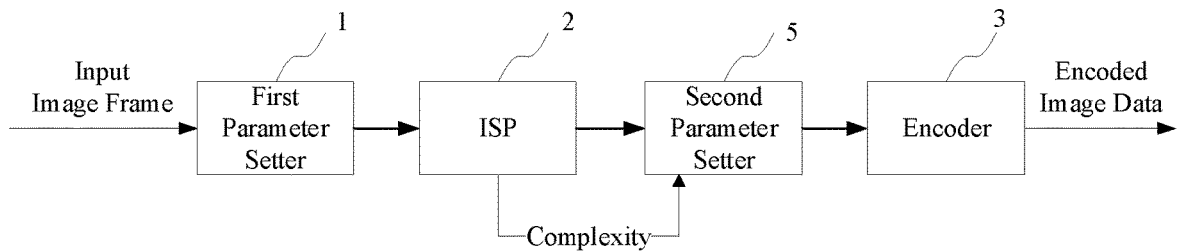
FIG. 7 is a diagram showing a second parameter setter setting a second configuration parameter for an encoder according to an embodiment of the present disclosure.

In an embodiment according to the present disclosure, the second parameter setter 5 may set the second configuration parameter for the encoder 3 in various ways as described below. FIGS. 7 to 10 are diagrams showing the second parameter setter setting the second configuration parameter for the encoder according to embodiments of the present disclosure In the embodiment as shown in FIG. 7, the image signal processor 2 is further configured to calculate the current complexity of the current image frame and to provide the current complexity to the second parameter setter 5. The second parameter setter 5 is configured to set the second configuration parameter corresponding to the current processed image data or corresponding to both the current processed image data and at least one of the subsequent processed image data for the encoder 3 based on the current complexity. The current complexity may include motion complexity, image texture complexity, image texture variance, etc. In some embodiments, complexities of image frames are associated with the second configuration parameter. A comparison table between the complexities of image frames (i.e., the current image frame or a subsequent image frame) and the second configuration parameter can be preset. When the second configuration parameter needs to be adjusted, matching second configuration parameters are found based on the corresponding current complexity and adjusted.

Figure 8:
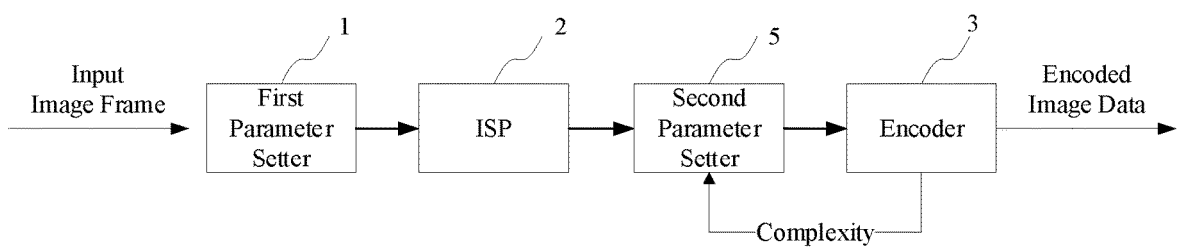
FIG. 8 is a diagram showing a second parameter setter setting a second configuration parameter for an encoder according to a further embodiment of the present disclosure.

In the embodiment as shown in FIG. 8, the encoder 3 is further configured to calculate a current complexity of current processed image data corresponding to the current image frame and to provide the current complexity to the second parameter setter 5. The second parameter setter 5 is configured to set the second configuration parameter corresponding to at least one of the subsequent processed image data for the encoder 3 based on the current complexity. The current complexity may include motion complexity, image texture complexity, image texture variance, encoder quantization parameter QP value, encoder structural similarity parameter ssim, etc. In some embodiments, complexities of processed image data are associated with the second configuration parameter. A comparison table between the complexities of processed image data and the second configuration parameter can be preset. When the second configuration parameter needs to be adjusted, matching second configuration parameters are found based on the corresponding current complexity and adjusted.

Figure 9:
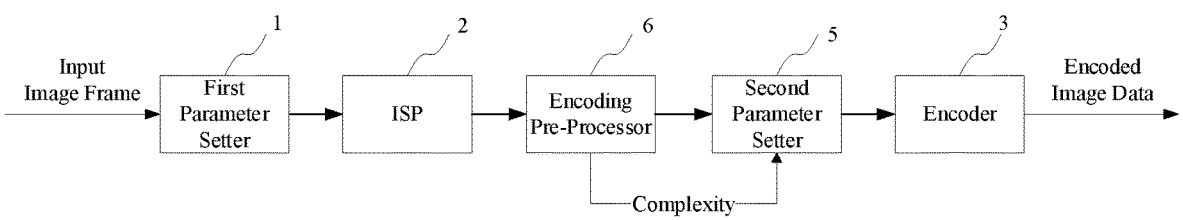
FIG. 9 is a diagram showing a second parameter setter setting a second configuration parameter for an encoder according to a further embodiment of the present disclosure.

In the embodiment as shown in FIG. 9, the apparatus for outputting image data according to the present disclosure further includes an encoding preprocessor 6. The encoding preprocessor 6 is connected to the image signal processor 2 and the second parameter setter 5. The encoding preprocessor 6 is configured to calculate a current complexity of current processed image data corresponding to the current image frame and to provide the current complexity to the second parameter setter 5. The second parameter setter 5 is configured to set the second configuration parameter corresponding to the current processed image data or corresponding to both the current processed image data and at least one of the subsequent processed image data for the encoder 3 based on the current complexity. In some embodiments, complexities of processed image data are associated with the second configuration parameter. A comparison table between the complexities of processed image data and the second configuration parameter can be preset. When the second configuration parameter needs to be adjusted, matching second configuration parameters are found based on the corresponding current complexity and adjusted.

Figure 10:
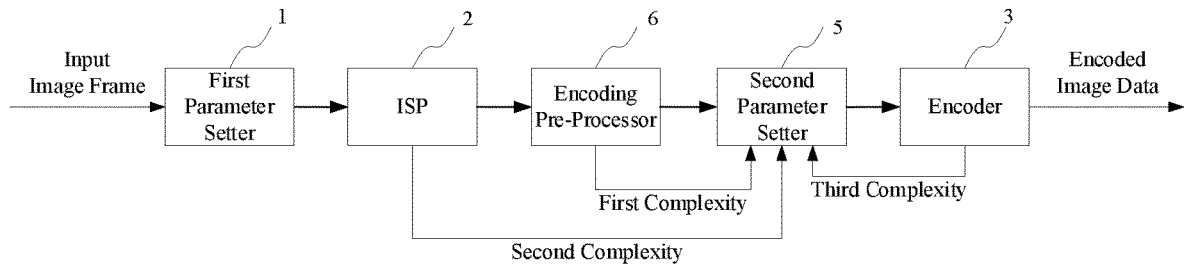
FIG. 10 is a diagram showing a second parameter setter setting a second configuration parameter for an encoder according to a further embodiment of the present disclosure.

In the embodiment as shown in FIG. 10, the encoding preprocessor 6 is configured to calculate a fourth complexity of the current processed image data corresponding to the current image frame and to provide the fourth complexity to the second parameter setter 5. The image signal processor 2 is further configured to calculate a fifth complexity of the current processed image data corresponding to the current image frame, and to provide the fifth complexity to the second parameter setter 5. The encoder 3 is further configured to calculate a sixth complexity of the current processed image data corresponding to the current image frame, and to provide the sixth complexity to the second parameter setter 5. The second parameter setter 5 is configured to set the second configuration parameter for the encoder based on at least two of the fourth complexity, the fifth complexity and the sixth complexity.

In some embodiments, a complexity includes an intra-frame complexity and an inter-frame complexity. The intra-frame complexity can be calculated based on intra-frame data of a processed image data corresponding to the current frame, and the inter-frame complexity can be calculated based on processed image data corresponding to the current frame and at least one previous frame.

According to embodiments of the present disclosure, configuration parameters for the encoder are evaluated by analyzing complexities associated with the input image frames, and the encoder is then adjusted according to the configuration parameters. In this way, the entire image processing system is more efficient, effectively improving the overall performance of image processing and encoding compression.

Figure 11:
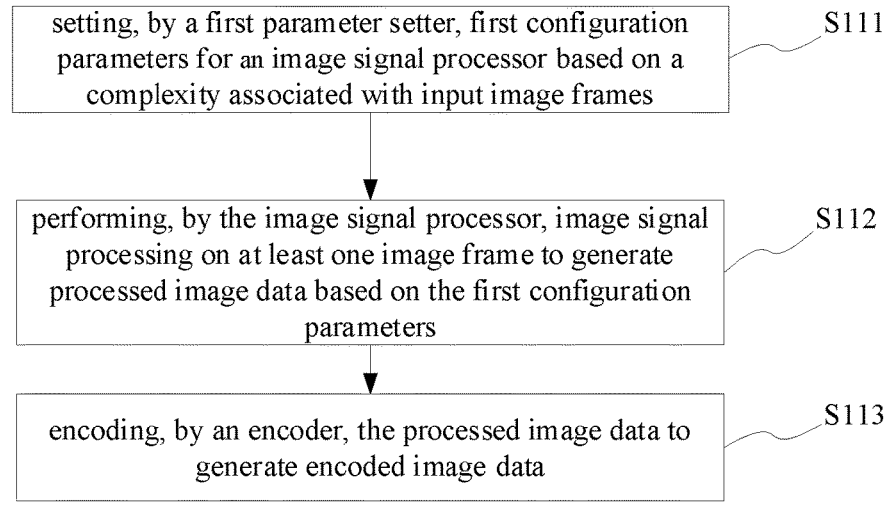
FIG. 11 is a flowchart illustrating a method for outputting image data according to an embodiment of the present disclosure.

FIG. 11 is a flowchart illustrating a method for outputting image data according to an embodiment of the present disclosure. As shown in FIG. 11, the method includes operations S111 to S113.

Operation S111 includes setting, by a first parameter setter, a first configuration parameter for an image signal processor based on a complexity associated with input image frames.

In some embodiments, the first configuration parameter includes 3D denoising parameters (3DNR), 2D denoising parameters (2DNR), contrast noise parameters (CNR), sharpening parameters, etc. Their adjustment can be done through preferential adjustment or precise adjustment.

Operation S112 includes performing, by the image signal processor, image signal processing on at least one image frame to generate processed image data based on the first configuration parameter.

In some embodiments, the image frames, that are successive and captured by an image acquisition device (e.g., a camera), are fed to the image signal processor for image signal processing to obtain the processed image data.

Operation S113 includes encoding, by an encoder, the processed image data to generate encoded image data.

In an embodiment according to the present disclosure, the first parameter setter may set the first configuration parameter for the image signal processor in various ways as described below.

In the embodiment as shown in FIG. 2, the image signal processor calculates a current complexity of a current image frame and to provide the current complexity to the first parameter setter. The first parameter setter sets the first configuration parameter corresponding to at least one subsequent image frame for the image signal processor based on the current complexity.

In the embodiment as shown in FIG. 3, the encoder calculates a current complexity of current processed image data corresponding to the current image frame and to provide the current complexity to the first parameter setter. It should be noted that the processed image data include the current processed image data corresponding to the current image frame and subsequent processed image data corresponding to the subsequent image frames. The first parameter setter is configured to set the first configuration parameter corresponding to at least one subsequent image frame for the image signal processor based on the current complexity.

In the embodiment shown in FIG. 4, a current complexity of a current image frame is calculated by an image signal preprocessor and the current complexity is provided to the first parameter setter. The first parameter setter sets the first configuration parameter corresponding to the current image frame or corresponding to both the current image frame and at least one subsequent image frame for the image signal processor based on the current complexity.

In the embodiment as shown in FIG. 5, the image signal preprocessor calculates a first complexity of the current image frame and to provide the first complexity to the first parameter setter. The image signal processor calculates a second complexity of the current image frame, and provides the second complexity to the first parameter setter. The encoder calculates a third complexity of the current processed image data corresponding to the current image frame, and provides the third current complexity to the first parameter setter. The first parameter setter sets the first configuration parameter based on at least two of the first complexity, the second complexity, and the third complexity.

In some embodiments, the method further includes: setting, by a second parameter setter, a second configuration parameter for the encoder. In some embodiments, the encoder encodes the processed image data to generate the encoded image data based on the second configuration parameter.

In an embodiment according to the present disclosure, the second parameter setter may set the second configuration parameter for the encoder in various ways as described below.

In the embodiment as shown in FIG. 7, the image signal processor calculates a current complexity of a current image frame and provides the current complexity to the second parameter setter. The second parameter setter sets the second configuration parameter corresponding to the current processed image data or corresponding to both the current processed image data and at least one of subsequent processed image data for the encoder based on the current complexity.

In the embodiment shown in FIG. 8, a current complexity of current processed image data corresponding to the current image frame is calculated by the encoder and provided to the second parameter setter. The second parameter setter sets the second configuration parameter corresponding to at least one of the subsequent processed image data for the encoder based on the current complexity.

In the embodiment shown in FIG. 9, the current complexity of the current processed image data corresponding to the current image frame is calculated by the encoding preprocessor and provided to the second parameter setter. The second parameter setter sets the second configuration parameter corresponding to the current processed image data or corresponding to both the current processed image data and at least one of subsequent processed image data for the encoder based on the current complexity.

In the embodiment shown in FIG. 10, a fourth complexity of the current processed image data corresponding to the current image frame is calculated by the encoding preprocessor and provided to the second parameter setter. A fifth complexity of the current processed image data corresponding to the current image frame is calculated by the image signal processor and provided to the second parameter setter. A sixth complexity of the current processed image data corresponding to the current image frame is calculated by the encoder and provided to the second parameter setter. Then the second parameter setter sets the second configuration parameter for the encoder based on at least two of the fourth complexity, fifth second complexity and the sixth complexity.

Figure 12:
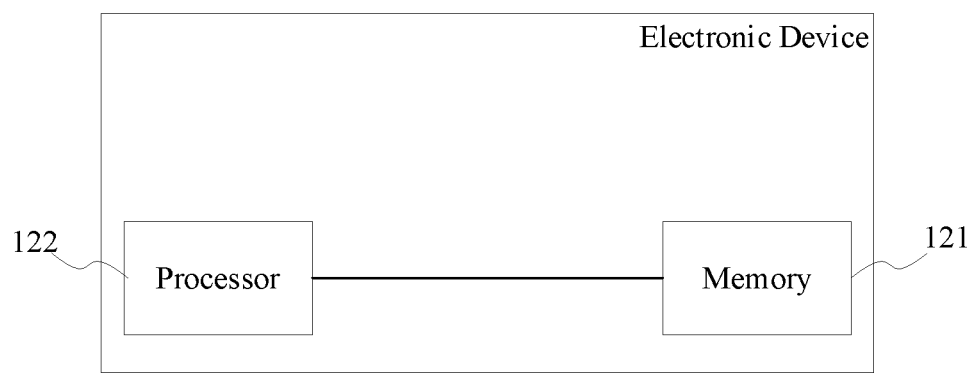
FIG. 12 shows a schematic diagram of an electronic device according to an embodiment of the present disclosure.

FIG. 12 shows a schematic diagram of an electronic device according to an embodiment of the present disclosure. As shown in FIG. 12, the electronic device includes a memory 121 and a processor 122. The memory 121 is configured to store a computer program. In some embodiments, the memory 121 is further configured to store image data required to output the input image frames as encoded image data. The processor 122 is communicatively coupled to the memory 121 and is configured to call the computer program to perform a method for outputting image data according to the foregoing description.

In some embodiments, the memory 121 includes one or more of a ROM, RAM, magnetic disk, U disk, memory card, optical disk, or other medium that can store program codes. The processor 122 can be a general processor, including a Central Processing Unit (CPU), a Network Processor (NP), etc. It can also be a Digital Signal Processor (DSP) or an Application Specific Integrated Circuit (ASIC), a Field Programmable Gate Array (FPGA) or other programmable logic devices, discrete gates or transistor logic devices, discrete hardware components.

Further, the present disclosure provides a computer readable storage medium having a computer program stored thereon and image data required to output the input image frames as encoded image data, wherein the computer program is executed by the processor to implement the method for outputting image data as described above. The memory may be a ROM, RAM, magnetic disk, U disk, memory card, optical disk, or other medium that can store program codes. In some embodiments, the computer-readable storage medium is further configured to store the image data required to output the input image frames as encoded image data.

For example, the first parameter setter and/or the second parameter setter may be one or more integrated circuits configured to implement the above methods, for example: one or more application specific integrated circuits (ASICs), or one or more microprocessors (Digital signal processor, DSP), or, one or more Image Signal Processors (ISP), or one or more Field Programmable Gate Array (FPGA), etc. For another example, when the first parameter setter and/or the second parameter setter is implemented in the form of processing element scheduling program code, the processing element may be a general-purpose processor, such as a central processing unit (CPU), a graphic processing unit (GPU), or other processors that can call program codes. For another example, the first parameter setter and/or the second parameter setter can be integrated together and implemented in the form of a system-on-a-chip (SOC).

In summary, in the apparatus and method for outputting image data, storage medium and electronic device of the present disclosure, the encoder's encoding state is evaluated based on the complexities of the input image frames, wherein the parameters of both the image signal processor and the encoder are then adjusted accordingly to effectively improve image processing performance; additionally, by adjusting the video source at the encoder's input end, source-level adjustments are achieved, making the entire image processing system more efficient; furthermore, the present disclosure can be applied to various application scenarios, even when the target bit rate is low or limited or when the application scenario is complex. Therefore, the present disclosure effectively overcomes various shortcomings of the prior art and has a high industrial value.

The above-mentioned embodiments are merely illustrative of the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. An apparatus for outputting image data, comprising a first parameter setter, an image signal processor, a second parameter setter, and an encoder, wherein the first parameter setter is configured to set a first configuration parameter for the image signal processor based on a complexity associated with a first image frame, the image signal processor is configured to perform an image signal processing on at least one second image frame to generate processed image data based on the first configuration parameter, and the image signal processor is configured to calculate a current complexity of a current image frame and provide the current complexity to the second parameter setter, the second parameter setter is configured to set a second configuration parameter for the encoder, and the second parameter setter is configured to set the second configuration parameter corresponding to current processed image data or corresponding to both the current processed image data and at least one of subsequent processed image data for the encoder based on the current complexity, and the encoder is configured to perform encoding processing on the processed image data to generate encoded image data based on the second configuration parameter, wherein the encoder is further configured to calculate a current complexity of current processed image data and provide the current complexity to the first parameter setter, and the first parameter setter is configured to set the first configuration parameter corresponding to at least one subsequent image frame for the image signal processor based on the current complexity.

2. The apparatus of claim 1, wherein
the image signal processor is further configured to calculate a current complexity of a current image frame and to provide the current complexity to the first parameter setter, and
the first parameter setter is configured to set the first configuration parameter corresponding to at least one subsequent image frame for the image signal processor based on the current complexity.

3. The apparatus of claim 1, wherein
the first parameter setter is configured to set the first configuration parameter based on the complexity associated with the first image frame provided from the encoder.

4. The apparatus of claim 1, further comprising an image signal preprocessor configured to calculate a current complexity of a current image frame and to provide the current complexity to the first parameter setter,
wherein the first parameter setter is configured to set the first configuration parameter corresponding to the current image frame or corresponding to both the current image frame and at least one subsequent image frame for the image signal processor based on the current complexity.

5. The apparatus of claim 1, further comprising an image signal preprocessor configured to calculate a first complexity of a current image frame and to provide the first complexity to the first parameter setter, wherein
the image signal processor is further configured to calculate a second complexity of the current image frame and to provide the second complexity to the first parameter setter,
the encoder is further configured to calculate a third complexity of current processed image data corresponding to the current image frame and to provide the third complexity to the first parameter setter, and
the first parameter setter is configured to set the first configuration parameter based on at least two of the first complexity, the second complexity, and the third complexity.

6. The apparatus of claim 1, wherein
the encoder is further configured to calculate a current complexity of current processed image data and to provide the current complexity to the second parameter setter, and
the second parameter setter is configured to set the second configuration parameter corresponding to at least one of subsequent processed image data for the encoder based on the current complexity.

7. The apparatus of claim 1, further comprising an encoding preprocessor configured to calculate a current complexity of current processed image data and to provide the current complexity to the second parameter setter,
wherein the second parameter setter is configured to set the second configuration parameter corresponding to the current processed image data or corresponding to both the current processed image data and at least one of subsequent processed image data for the encoder based on the current complexity.

8. The apparatus of claim 1, further comprising an encoding preprocessor configured to calculate a fourth complexity of current processed image data and to provide the fourth complexity to the second parameter setter, wherein
the image signal processor is further configured to calculate a fifth complexity of the current processed image data and to provide the fifth complexity to the second parameter setter,
the encoder is further configured to calculate a sixth complexity of the current processed image data and to provide the sixth complexity to the second parameter setter, and
the second parameter setter is configured to set the second configuration parameter for the encoder based on at least two of the fourth complexity, fifth second complexity and the sixth complexity.

9. A method for outputting image data, comprising:
setting, by a first parameter setter, a first configuration parameter for an image signal processor based on a complexity associated with a first image frame, which is performed by:
calculating, by the encoder, a current complexity of current processed image data and providing the current complexity to the first parameter setter; and
setting, by the first parameter setter, the first configuration parameter corresponding to at least one subsequent image frame for the image signal processor based on the current complexity;
performing, by the image signal processor, an image signal processing on at least one second image frame to generate processed image data based on the first configuration parameter;
setting, by a second parameter setter, a second configuration parameter for the encoder, which is performed by:
calculating, by the image signal processor, a current complexity of a current image frame, and providing the current complexity to the second parameter setter; and
setting, by the second parameter setter, the second configuration parameter corresponding to current processed image data or corresponding to both the current processed image data and at least one of subsequent processed image data for the encoder based on the current complexity; and
encoding, by an encoder, the processed image data to generate encoded image data based on the second configuration parameter.

10. The method of claim 9, wherein setting, by a first parameter setter, a first configuration parameter for an image signal processor based on a complexity associated with the image frame comprises:
calculating, by the image signal processor, a current complexity of a current image frame, and providing the current complexity to the first parameter setter; and setting, by the first parameter setter, the first configuration parameter corresponding to at least one subsequent image frame for the image signal processor based on the current complexity.

11. The method of claim 9, wherein setting, by a first parameter setter, a first configuration parameter for an image signal processor based on a complexity associated with a first image frame comprises:
calculating, by an image signal preprocessor, a current complexity of a current image frame, and providing the current complexity to the first parameter setter; and
setting, by the first parameter setter, the first configuration parameter corresponding to the current image frame or corresponding to both the current image frame and at least one subsequent image frame for the image signal processor based on the current complexity.

12. The method of claim 9, wherein setting, by a first parameter setter, a first configuration parameter for an image signal processor based on a complexity associated with a first image frame comprises:
calculating, by an image signal preprocessor, a first complexity of a current image frame and providing the first complexity to the first parameter setter;
calculating, by the image signal processor, a second complexity of the current image frame, and providing the second complexity to the first parameter setter; and
calculating, by the encoder, a third complexity of current processed image data corresponding to the current image frame and to provide the third current complexity to the first parameter setter; and
setting, by the first parameter setter, the first configuration parameter based on at least two of the first complexity, the second complexity, and the third complexity.

13. The method of claim 9, wherein setting, by a second parameter setter, a second configuration parameter for the encoder comprises:
calculating, by the encoder, a current complexity of current processed image data corresponding to a current image frame, and providing the current complexity to the second parameter setter; and
setting, by the second parameter setter, the second configuration parameter corresponding to at least one of subsequent processed image data for the encoder based on the current complexity.

14. The method of claim 9, wherein setting, by a second parameter setter, a second configuration parameter for the encoder comprises:
calculating, by an encoding preprocessor, a current complexity of current processed image data corresponding to a current image frame and providing the current complexity to the second parameter setter; and
setting, by the second parameter setter, the second configuration parameter corresponding to the current processed image data or corresponding to both the current processed image data and at least one of subsequent processed image data for the encoder based on the current complexity.

15. The method of claim 9, wherein setting, by a second parameter setter, a second configuration parameter for the encoder comprises:
calculating, by an encoding preprocessor, a fourth complexity of current processed image data corresponding to a current image frame and providing the fourth complexity to the second parameter setter;
calculating, by the image signal processor, a fifth complexity of the current processed image data, and providing the fifth complexity to the second parameter setter,
calculating, by the encoder, a sixth complexity of the current processed image data, and providing the sixth current complexity to the second parameter setter; and
setting, by the second parameter setter, the second configuration parameter for the encoder based on at least two of the fourth complexity, the fifth complexity, and the sixth complexity.

16. An electronic device, comprising:
a memory, configured to store a computer program; and
a processor, communicatively connected to the memory and configured to call the computer program to perform:
setting a first configuration parameter based on a complexity associated with a first image frame, which is performed by:
calculating, by an encoder, a current complexity of current processed image data and providing the current complexity to a first parameter setter; and
setting, by the first parameter setter, the first configuration parameter corresponding to at least one subsequent image frame for an image signal processor based on the current complexity;
performing image signal processing on at least one second image frame to generate processed image data based on the first configuration parameter;
setting, by a second parameter setter, a second configuration parameter for the encoder, which is performed by:
calculating, by the image signal processor, a current complexity of a current image frame, and providing the current complexity to the second parameter setter; and
setting, by the second parameter setter, the second configuration parameter corresponding to the current processed image data or corresponding to both the current processed image data and at least one of subsequent processed image data for the encoder based on the current complexity; and
encoding the processed image data to generate encoded image data based on the second configuration parameter.

* * * * *